United States Patent
Tüllmann et al.

(10) Patent No.: US 8,425,386 B2
(45) Date of Patent: Apr. 23, 2013

(54) TOOL CHANGER FOR MACHINE TOOLS

(75) Inventors: Udo Tüllmann, Eisenach (DE); Stephan Kümmel, Falkenstein/Harz (DE); Andreas Kretzschmar, Cunewalde (DE)

(73) Assignee: Deckel Maho Seebach GmbH, Seebach (DE)

( * ) Notice: Subject to any disclaimer, the term of this patent is extended or adjusted under 35 U.S.C. 154(b) by 744 days.

(21) Appl. No.: 12/626,297

(22) Filed: Nov. 25, 2009

(65) Prior Publication Data

US 2010/0173762 A1    Jul. 8, 2010

(30) Foreign Application Priority Data

Nov. 27, 2008  (DE) .......................... 10 2008 059 422

(51) Int. Cl.
*B23Q 3/157* (2006.01)

(52) U.S. Cl.
USPC ............... 483/44; 483/49; 483/52; 74/813 R; 74/820; 74/826

(58) Field of Classification Search ............ 483/44, 483/49, 45–46, 38–41, 56–57, 67, 61, 51–52; 74/813 R, 820, 826
See application file for complete search history.

(56) References Cited

U.S. PATENT DOCUMENTS

| | | | | |
|---|---|---|---|---|
| 4,817,267 A | * | 4/1989 | Hitomi | 483/44 |
| 4,833,772 A | * | 5/1989 | Kobayashi et al. | 483/44 |
| 5,424,621 A | * | 6/1995 | Hwang et al. | 483/44 |
| 5,762,594 A | * | 6/1998 | Hoppe | 483/56 |

FOREIGN PATENT DOCUMENTS

| | | | |
|---|---|---|---|
| DE | 9110377 U1 | * | 2/1992 |
| DE | 4300745 A1 | * | 7/1994 |
| DE | 102008006175 A1 | * | 7/2009 |
| JP | 58-045836 A | * | 3/1983 |
| JP | 03-033035 U | * | 4/1991 |
| SU | 1144844 A | * | 3/1985 |
| SU | 1562100 A1 | * | 5/1990 |

OTHER PUBLICATIONS

Machine Translation of DE 4300745, which DE '745 was published Jul. 1994.*

* cited by examiner

*Primary Examiner* — Erica E Cadugan
(74) *Attorney, Agent, or Firm* — The Maxham Firm

(57) ABSTRACT

A tool changer for machine tools, the tool changer having at least one rotatable tool gripper, a supporting column for the tool gripper which can be lifted and lowered and rotated about a rotational axis, a mechanical cam gear for generating the lifting and rotating movements of the tool gripper, all driven by a drive motor connected to a cam barrel and intermediate gearing. The cam barrel has a tappet for the rotational drive of the tool gripper on its upper front and a cam curve or groove on its peripheral surface for the lifting movement of the tool gripper. The tappet drives a Maltese wheel supported on a shaft parallel to the rotational axis of the tool gripper. The Maltese wheel, the cam barrel, and the supporting column of the tool gripper are successively supported in a manner parallel to the axis.

20 Claims, 3 Drawing Sheets

INITIAL AND END POSITIONS

INTERMEDIATE POSITION

TOOL CHANGER FOR MACHINE TOOLS

FIELD OF THE INVENTION

The invention relates to a tool changer for machine tools, comprising at least one tool gripper, a supporting column for the tool gripper which can be lifted and lowered and rotated about the longitudinal axis, and a mechanical cam gear for generating the lifting and rotating movements of the tool gripper, which cam gear has a cam barrel, a drive motor, and an intermediate gear.

DISCUSSION OF PRIOR ART

In modern metal-cutting machine tools, tool-changing devices of various types are customary which have a tool storage mostly disposed outside of the actual working space, and a tool changer. By means of these systems, automatic tool changes are performed in order to reduce the non-productive times of the respective working machine, the so-called tool change cycle times. In particular, it is intended to minimize the actual tool allowances which represent a considerable proportion of the tool change cycle times. In order to perform a tool change within a time period as short as possible, several movements of components of the tool changer are combined with one another. For example, a lowering movement of the tool gripper for taking the tool to be exchanged out of the work spindle of the machine tool, which has moved into the change position beforehand, a subsequent rotational movement of the tool gripper of a rotational angle of usually 180° for removing the tool to be exchanged from the position below the work spindle and for moving a tool to be inserted into this position at the same time, and finally a lifting movement for introducing the tool to be inserted to the clamping cone of the work spindle. Suitably, this combined lifting and pivoting movement is made "in one go" without any standstill or sensor evaluation times. In order to generate such a continuous movement, mechanical cam gears are used which comprise a cam barrel, a drive motor for moving, particularly rotating, the cam barrel, and an intermediate gear. Cam tracks are formed on the barrel shell with which tappet members engage. A rotational movement of the cam barrel rotates a supporting column of a tool gripper about the longitudinal axis thereof and at the same time moves it in a longitudinal direction, causing corresponding rotating and vertical movements of the tool gripper.

It is a particular problem in the design of mechanical cam gears to keep the diameter of the cam barrel as small as possible. Only with a sufficiently small barrel diameter is it possible to realize both the acceleration and the deceleration extremely fast because the moments of inertia of this lifting and pivoting gear are low due to the small barrel diameter. On the other hand, when the barrel diameter is reduced, the steepness of the curves will increase whereby the loading of the mechanical components will rise.

In a known mechanical cam gear a groove-shaped cam track is formed on the upper front of a cam barrel, in which cam track a tappet is guided for generating a lifting movement of the supporting column including the tool gripper. The rotational movement of the gripper is initiated by one or more cams on the shell surface of the cam barrel that have only a limited steepness which can only be achieved by a correspondingly large barrel diameter of approximately 250 mm. All in all, the result will be a relatively voluminous mechanical cam gear and relatively high moments of inertia so that high driving powers have to be set up in order to attain short tool allowances. Apart from the undesirably high mechanical loadings, this known mechanical cam gear also requires a relatively large constructional space on the machine tool which may make it necessary to have to move the work spindle to the tool changer and the tool gripper, respectively, for a tool change in accordance with the pick-up principle. These movements are very time-consuming, in particular with machine tools having large axial paths because these machines have massive and heavy carriage units so as to ensure sufficient stiffness during metal cutting despite the large axial paths.

SUMMARY OF THE INVENTION EMBODIMENTS

It is a purpose of the invention to provide a tool changer for machine tools whose mechanical cam gear is structured in a technically simple and compact manner, which has low inertias so that only relatively small driving powers are required and which allows a fast change of tools while reducing the tool change cycle times.

According to embodiments of the invention, this purpose results, at least in pat, from the fact that the cam barrel of the mechanical cam gear has a tappet for the rotational drive of the tool gripper on the upper front and a cam curve for the lifting movement of the tool gripper on its circumference, that the tappet engages with a Maltese wheel supported on a shaft which is parallel to the rotational axis of the tool gripper, and the supporting column of the tool gripper, the cam barrel and the Maltese wheel are successively arranged with rotational axes parallel to the axis.

The arrangement of the gear members of the lifting and pivoting gear on three axes successively arranged in parallel to one another results in the aspired compactness of the mechanical gear, that is, the small width of the tool changer. This narrowness makes the use of this tool changer possible even in case of little available space on the machine due to its elongate narrow shape.

A double gripper is used whose one gripper receives the tool to be exchanged and whose other gripper contains the tool to be inserted. In order to perform the lifting and lowering movements required for a change operation, the double gripper is fixed to a supporting column which can be vertically moved in a longitudinal direction and has a rod guide enabling the lifting movement required for the tool change. Furthermore, the supporting column is accommodated in a support enabling a rotational movement of the tool gripper about the column axis for transferring the tools. The cam guide has a tappet engaging directly with the cam curve attached to the peripheral surface of the cam barrel. Thus, the lifting movement of the tool gripper required for the tool change is generated and timely synchronized to the rotational movement thereof. Based on the arrangement of the cam curve on the peripheral surface of the cam barrel the cam curve can receive a practicable steepness and at the same time it is possible to considerably reduce the diameter of the cam barrel as compared to the prior art, for example, to about 130 mm, which consequently effects lowered inertias and lower mechanical loadings of the structural parts.

According to embodiments of the invention, the rotational movement of the tool gripper is generated by the tappet on the front of the cam barrel. This tappet engages with a Maltese or Geneva wheel supported on a shaft parallel to the rotational axis of the tool gripper. In order to be able to keep the diameter of the cam barrel small, the gear ratio of the Maltese step is selected so as make only a slight change of the angular distance from one drive to the next. However, as the tool gripper requires a rotation by 180°, which cannot be achieved by a Maltese step in a reasonable manner, the rotation of the Maltese wheel is geared by an intermediate gear such that the tool gripper carries out a rotation of 180°. The intermediate gear consists of a gear wheel disposed on the Maltese wheel and meshing with a gear wheel set separately supported on the shaft of the cam barrel, whose second gear wheel in turn drives a gear wheel disposed on the rotational axis of the tool gripper. With respect to diameter and tooth number, these gear wheels are dimensioned such that a total rotation of the tool gripper by 180° results.

The arrangement according to embodiments of the invention minimizes the required space for the mechanical earn gear as well as the other components for the lifting and pivoting movements of the tool gripper by reducing the diameter of the cam barrel and by arranging the cam curve on the peripheral surface of the cam barrel. Particularly advantageous outer dimensions of the tool changer result from the successive arrangement of the drive motor, cam barrel, intermediate gear wheels and supporting column with axes that are parallel, preferably vertical, to one another. Furthermore, the Maltese wheel and the coupling thereof with the intermediate gear make a rotational drive of the tool gripper without jolt possible. By providing the intermediate gear for the rotational movement of the tool gripper it is possible to keep the required angle at circumference for the drive small, an angle of the cam barrel of between about 45° and about 150° at circumference, which allows a further reduction of the barrel diameter.

The tool changer according to at least one embodiment of the invention can be disposed in a stationary manner on the machine tool, that is, the supporting column having the tool gripper mounted to the upper end thereof is constantly in a particular position and the horizontal movements required for a tool change are carried out by the work spindle.

In an advantageous embodiment of the invention, the tool changer has a narrow elongate stationary foundation and a carriage which can be moved thereon in the longitudinal direction. The carriage consists of a housing in which the functional parts of the tool changer are accommodated and which is moved by a linear drive, for example, an air-oil cylinder, a spindle drive, or the like. In this embodiment the relative horizontal movements required for a tool change are carried out by the tool gripper located on the carriage, wherein apart from these, horizontal movements of the work spindle are also possible.

An arrangement which is particularly favorable from the point of view of energy consumption and space-saving is achieved by the fact that the drive motor is disposed on end, that is, in a vertical orientation, in the housing of the stationary tool changer and the carriage, respectively, in a manner parallel to the axis and upstream of the cam barrel. This allows the cam barrel to be driven via a pair of gear wheels functioning as a reduction gear and the arrangement of the Maltese wheel including the intermediate gear in the housing above the drive motor and the cam barrel.

BRIEF DESCRIPTION OF THE DRAWING

The invention is further described below by means of the subsequent detailed description of advantageous embodiment examples of the invention, reference being made to accompanying drawing, wherein:

FIG. 3b is a schematic side view of the tool changer of FIG. 3a;

FIG. 4b is a schematic side view of the tool changer in the position shown in FIG. 4a.

DETAILED DESCRIPTION OF EMBODIMENTS OF THE INVENTION

Figure 1:
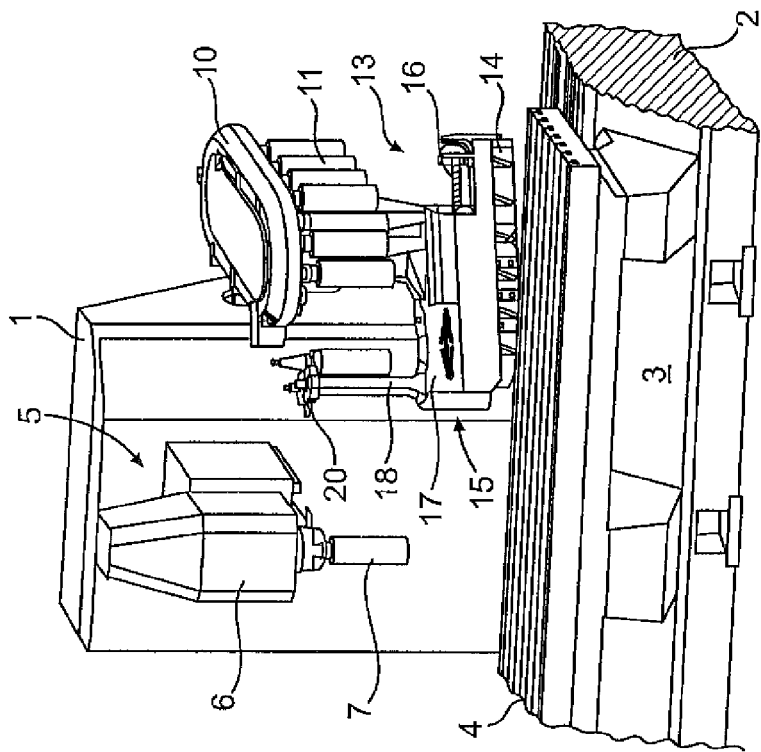
FIG. 1 is a schematic perspective of a program-controlled milling machine comprising a tool changing device according to the invention.

The milling machine schematically illustrated in FIG. 1 in a perspective view comprises machine stand 1 and bed 2, which is arranged on the front side of the stand. Workpiece table 4 is mounted on sloping front 3 of bed 2. Working unit 5 has been arranged at the vertical front of stand 1. Milling head 6 of working unit 5, which is shown vertically arranged on the stand, has tool 7 clamped there by a conventional tool holding fixture. To the right of the stand 1, as viewed in FIG. 1, is tool chain magazine 10 comprising a plurality of vertically oriented tools 11 hung from the circulating magazine chain. By driving the magazine chain, a respective one of tools 11 can be moved to a tool change position.

As shown in FIG. 1, below chain magazine 10 is tool changer 13 which has carriage 15 on foundation 14 which is also disposed in a sloping horizontal orientation alongside machine stand 1. Carriage 15 can be moved by motor spindle drive 16 on foundation 14 in the direction of the double arrow and forms housing 17. A vertically oriented supporting column 18 is rotatably supported at the free end of carriage 15. On the upper end of column 18 is tool double gripper 20 comprising two diametrical gripper tongs.

Figure 2:
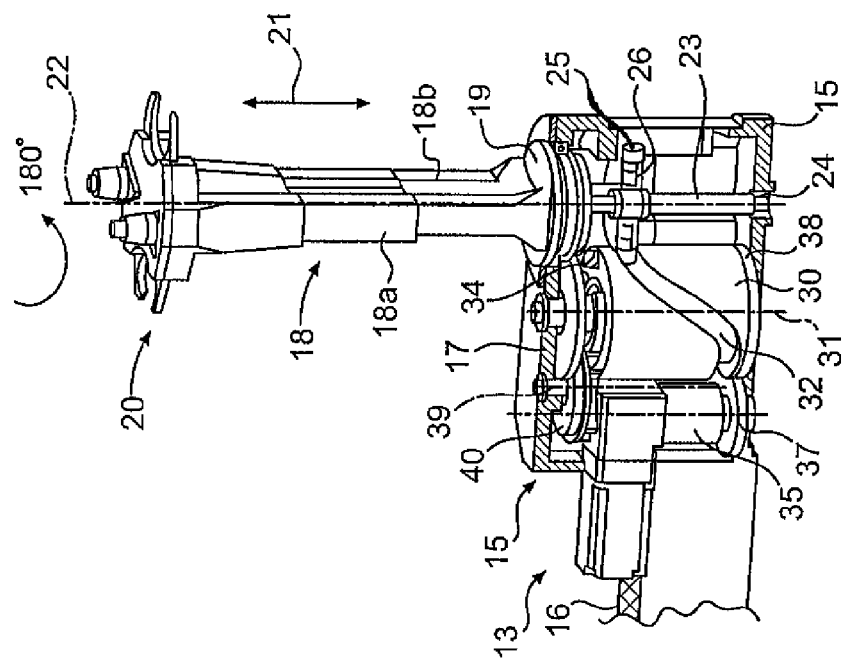
FIG. 2 is a schematic perspective of the tool changer shown in FIG. 1.

As can be seen from FIG. 2, supporting column 18 comprises two upper telescoping supporting struts 18a, 18b, the lower end of column 18 being fixed to common rotating disk 19. At the upper end of column 18 is tool gripper 20, which formed as a double gripper. Portions of supporting column 18 can be moved linearly in the direction of double arrow 21, and can be rotated by 180° about its rotational axis 22 (cf. FIGS. 3 and 4). As can be taken from FIG. 2, rod guide 23 is provided under supporting column 18 on rotational axis 22. The lower end of the rod guide is supported in floor bearing 24 of housing 17. A transversely aligned member 26 is supported for vertical movement on rod guide 23. Member 26 is connected to the upper portion of supporting column 18 and has cam followers or tappets 25 at its ends. In housing 17, cam barrel 30, whose rotational axis 31 is oriented parallel to rotational axis 22 of supporting column 18, is supported alongside rod guide 23 of the supporting column. On the peripheral surface of cam barrel 30 (referred to also as a lifting barrel), groove-shaped cam curve 32 is formed with which tappet 25 of rod guide 23 engages.

On the upper front of the cam or lifting barrel 30, further tappet 34 is eccentrically fixed which cooperates with Maltese wheel 40 (described below) when the lifting barrel is rotated.

In housing 17 of carriage 15, in the front part, is drive motor 35, disposed parallel to the axis of cam barrel 30, whose driven shaft 36 (see FIGS. 3b and 4b) carries gear wheel 37 engaging with another gear wheel 38 at the bottom end of the lifting barrel. The gear wheel pairing 37, 38 forms a reduction gear by means of which lifting barrel 30 is driven by motor 35. Motor 35 may be an electric motor but it could be some other suitable driving device.

Figure 3A:
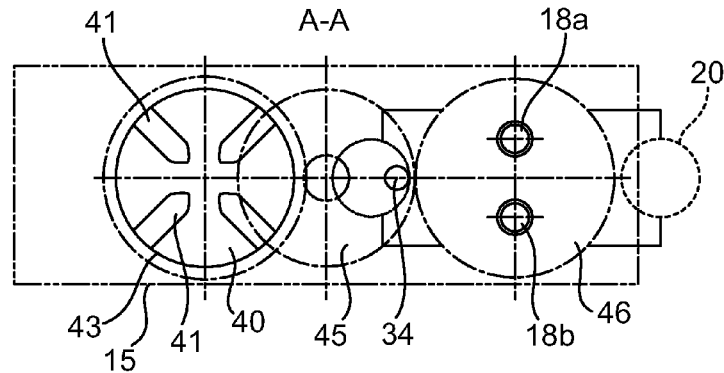
FIG. 3a illustrates the mechanical design of the tool changer according to FIG. 2 in initial and end positions.
Figure 3B:
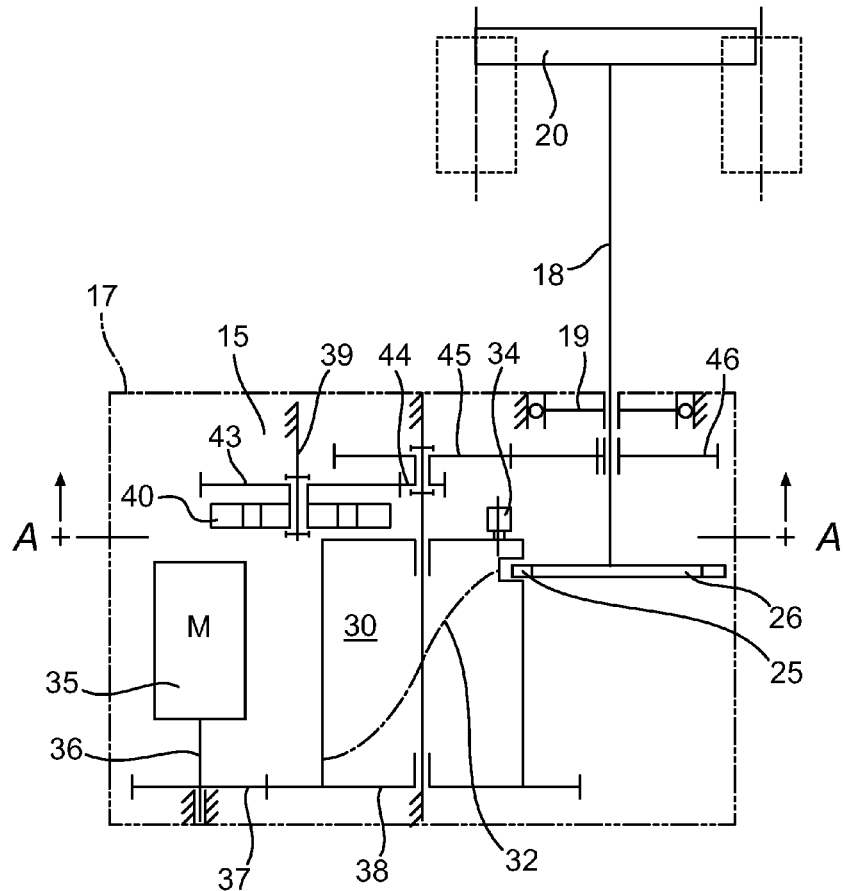
Figure 4A:
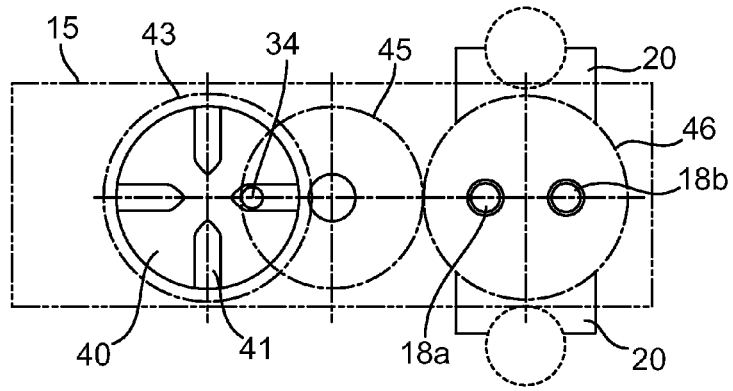
FIG. 4a illustrates of the mechanical design of the tool changer according to FIG. 2 in an intermediate position.
Figure 4B:
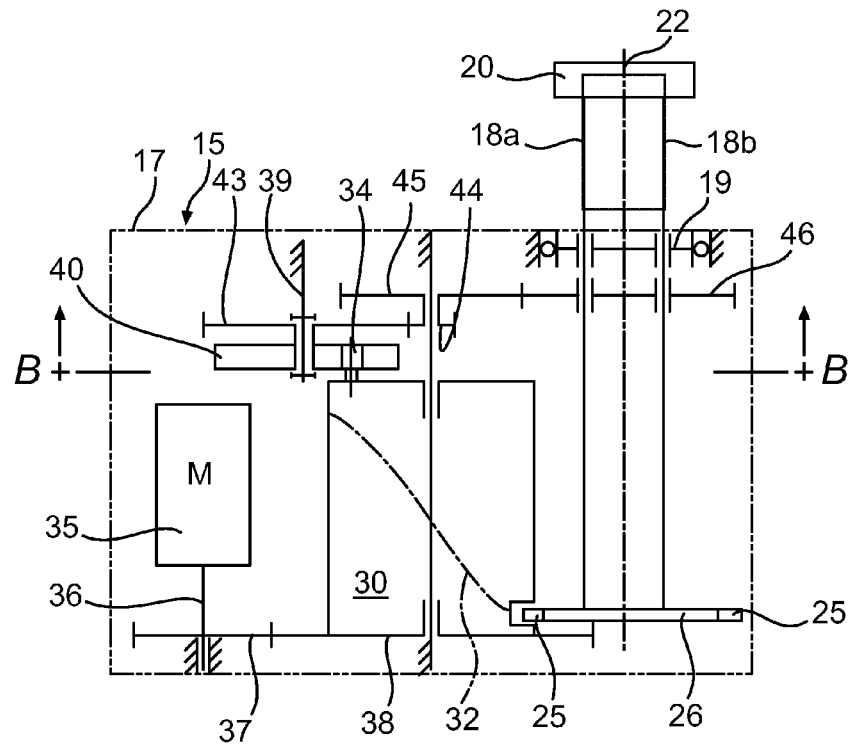

Maltese wheel 40, which is schematically shown in FIGS. 3a, 4a, is fixed to shaft 39 supported in the cover plate of carriage housing 17 and aligned in parallel to barrel axis 31. Tappet 34 is fixed to the upper side of barrel 30 and is configured to engage with one of radial slots 41 of the Maltese wheel and set the wheel into rotation, as shown in FIGS. 4a and 4b. A coaxially supported gear wheel 43 is mounted to Maltese wheel 40, which gear wheel 43 is engaged with pinion 44 supported on shaft 31 of barrel 30. Gear wheel 45, which is engaged with another gear wheel 46, is mounted to pinion 44. Gear wheels 43 to 46 form an intermediate gear.

As can be taken from FIGS. 3 and 4, cam barrel 30, supporting column 18, Maltese wheel 40, drive motor 35, and the gear wheels of both the reduction gear and the intermediate gear are disposed in common housing 17 with respectively vertical axes parallel to one another in a row.

One of the advantages of embodiments of the tool changer according to the invention, that being the relatively small width, can be observed in particular from FIGS. 3 and 4. This elongate narrow shape enables a sloping orientation of the tool changer to the machine tool and its working space, respectively, in the horizontal plane, which is shown in FIG. 1. This small width is achieved by successively arranging the individual components, that is, supporting column 18, barrel 30, Maltese wheel 40, and drive motor 35 in line or in a row. The intended small diameter of barrel 30 is obtained by forming cam curve 32 on the peripheral surface of the barrel, and tappet 34 engaging with the Maltese wheel on the upper front of barrel 30.

As can be seen from FIG. 3, supporting column 18 and tool gripper 20 are in the top initial position in which tappet 25 engages with the top portion of cam curve 32 on the lifting barrel and tappet 34, disposed on the front of the lifting barrel, is in the position opposite to or spaced from Maltese wheel 40. By activating drive motor 35, lifting barrel 30 is rotated via reduction gear 37, 38 into the intermediate position shown in FIG. 4, in which supporting column 18 and thus, also, tool gripper 20, are in their lowest position. Due to the half rotation of the lifting barrel, tappet 34 has moved to the diametrically opposite position and pushed into one of radial slots 41 of the Maltese wheel. The resulting rotational movement of Maltese wheel 40 is transferred to supporting column 18 and thereby also to tool grippers 20 via the intermediate gear, that is, gear wheel sets 43 to 46. The lifting and pivoting movement of tool gripper 20 resulting therefrom is a continuous movement which makes fast automatic tool changes possible while relatively little space is required. Tool changer 13, including its lifting and pivoting gear, is formed in a compact manner and occupies a small structural space. Thus, carriage 15 carrying the tool gripper, among others, can be formed narrowly, that is, only slightly wider than the maximum diameter of the tools to be inserted.

The invention is not limited to the embodiments illustrated in the drawing and described above. For example, the foundation of the tool changer can form the stationary supporting structure for housing 17, or the functional parts of the tool changer, that is, instead of carriage 15, housing 17 may be solidly mounted to foundation 14. In this case the horizontal movements required for the change of a tool between the tool holding fixture in the work spindle and the respective tool gripper are carried out by the work spindle or the milling head. Apart from that, cam or lifting barrel 30 can also be disposed upstream of drive motor 35 in housing 17 in a row with the motor and with supporting column 18.

What is claimed is:

1. A tool changer for replacing a machining tool held by a working unit with another machining tool to be held by the working unit, the tool changer comprising:
   a housing;
   a supporting column rotationally coupled to said housing, a portion of said supporting column being configured for linear movement so as to be selectively raised and lowered, said supporting column being rotatable relative to said housing about a first axis;
   at least one tool gripper mounted on said supporting column for linear movement with the portion of said supporting column and for rotational movement with the supporting column;
   a Maltese wheel rotatably mounted to said housing on a first shaft having a longitudinal rotation axis parallel to said first axis;
   cam gear apparatus coupled to said supporting column for raising, lowering, and rotating said at least one tool gripper, said cam gear apparatus comprising:
      a drive motor;
      a cam barrel having a longitudinal rotation axis parallel to said first axis; and
      an intermediate gear arrangement coupled between said Maltese wheel and said supporting column;
   a first tappet on said cam barrel, said first tappet being configured to engage and rotationally drive said Maltese wheel;
   a cam curve on said cam barrel;
   a second tappet mounted to said supporting column and engaging said cam curve for raising and lowering said portion of said supporting column and said at least one tool gripper, said second tappet being at least one end of a member that is configured to be linearly guided along the first axis along a guide rod whose longitudinal axis is coaxial with the first axis.

2. The tool changer according to claim 1, where said cam barrel, said supporting column, said Maltese wheel, said drive motor, and said intermediate gear arrangement are arranged in said housing, and wherein said first axis, said longitudinal rotation axis of said cam barrel, said longitudinal rotation axis of said first shaft of said Maltese wheel, a rotation axis of an output shaft of the drive motor, and rotation axes of gear wheels of the intermediate gear arrangement, are vertical axes.

3. The tool changer according to claim 2, wherein said housing is part of a carriage which can be moved linearly on a stationary foundation.

4. The tool changer according to claim 3, wherein said supporting column is configured with upper and lower telescoping segments,
   wherein said guide rod is connected to the upper segment of said supporting column and extends downwardly from said supporting column; and
   wherein said member is a transversely aligned member, having a longitudinal axis that is transverse with respect to said first axis, mounted on said rod guide for vertical movement in the direction of said first axis with respect to said guide rod.

5. The tool changer according to claim 2, wherein said housing is slidingly mounted to a stationary and elongate foundation.

6. The tool changer according to claim 5, wherein said supporting column is configured with upper and lower telescoping segments, wherein said guide rod is connected to the upper segment of said supporting column and extends downwardly from said supporting column; and wherein said member is a transversely aligned member, having a longitudinal axis that is transverse with respect to said first axis, mounted on said rod guide for vertical movement in the direction of said first axis with respect to said guide rod.

7. The tool changer according to claim 2, wherein said supporting column is configured with upper and lower telescoping segments, wherein said guide rod is connected to the upper segment of said supporting column and extends downwardly from said supporting column; and wherein said member is a transversely aligned member, having a longitudinal axis that is transverse with respect to said first axis, mounted on said rod guide for vertical movement in the direction of said first axis with respect to said guide rod.

8. The tool changer according to claim 2, wherein the rotation axis of the output shaft of said drive motor is disposed parallel to the longitudinal rotation axis of said cam barrel.

9. The tool changer according to claim 2, and further comprising reduction gears by which said drive motor drives said cam barrel.

10. The tool changer according to claim 2, wherein said intermediate gear arrangement comprises gear wheel sets successively arranged in a row with the rotation axes of each of the gear wheels being parallel to said first axis.

11. The tool changer according to claim 2, wherein said supporting column is formed with two supporting struts having longitudinal axes that are parallel to each other.

12. The tool changer according to claim 1, wherein said supporting column is configured with upper and lower telescoping segments, wherein said guide rod is connected to the upper segment of said supporting column and extends downwardly from said supporting column; and wherein said member is a transversely aligned member, having a longitudinal axis that is transverse with respect to said first axis, mounted on said rod guide for vertical movement in the direction of said first axis with respect to said guide rod.

13. The tool changer according to claim 12, wherein a rotation axis of an output shaft of said drive motor is disposed parallel to the longitudinal rotation axis of said cam barrel.

14. The tool changer according to claim 12, and further comprising reduction gears by which said drive motor drives said cam barrel.

15. The tool changer according to claim 12, wherein said intermediate gear arrangement comprises gear wheel sets successively arranged in a row with rotation axes of each of the gear wheels being parallel to said first axis.

16. The tool changer according to claim 12, wherein said supporting column is formed with two supporting struts having longitudinal axes that are parallel to each other.

17. The tool changer according to claim 1, wherein a rotation axis of an output shaft of said drive motor is disposed parallel to the longitudinal rotation axis of said cam barrel.

18. The tool changer according to claim 1, and further comprising reduction gears by which said drive motor drives said cam barrel.

19. The tool changer according to claim 1, wherein said intermediate gear arrangement comprises gear wheel sets successively arranged in a row with rotation axes of each of the gear wheels being parallel to said first axis.

20. The tool changer according to claim 1, wherein said supporting column is formed with two supporting struts having longitudinal axes that are parallel to each other.

* * * * *